United States Patent
Kim et al.

(10) Patent No.: US 12,358,054 B2
(45) Date of Patent: Jul. 15, 2025

(54) METHOD FOR COATING METAL, METAL MEMBER COMPRISING COATING LAYER FORMED THEREBY AND FUEL CELL SEPARATOR

(71) Applicant: KOREA ATOMIC ENERGY RESEARCH INSTITUTE, Daejeon (KR)

(72) Inventors: Hyun Gil Kim, Daejeon (KR); Yang Il Jung, Daejeon (KR); Dong Jun Park, Daejeon (KR); Jung Hwan Park, Daegu (KR); Jong Dae Hong, Daejeon (KR); Il Hyun Kim, Sejong-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 779 days.

(21) Appl. No.: 17/528,329

(22) Filed: Nov. 17, 2021

(65) Prior Publication Data
US 2022/0161325 A1   May 26, 2022

(30) Foreign Application Priority Data
Nov. 24, 2020 (KR) .............. 10-2020-0158757

(51) Int. Cl.
*B22F 10/25* (2021.01)
*B33Y 10/00* (2015.01)
(Continued)

(52) U.S. Cl.
CPC .............. *B22F 10/25* (2021.01); *B33Y 10/00* (2014.12); *B33Y 80/00* (2014.12); *H01M 8/021* (2013.01); *H01M 8/0228* (2013.01)

(58) Field of Classification Search
CPC .... B22F 10/25; B22F 10/366; B22F 2999/00; B22F 2007/042; B33Y 10/00;
(Continued)

(56) References Cited

U.S. PATENT DOCUMENTS

| | | | |
|---|---|---|---|
| 2016/0108507 A1* | 4/2016 | Kim | C22C 1/02 148/423 |
| 2019/0176273 A1* | 6/2019 | Srinivasan | B23K 26/1476 |
| 2021/0197281 A1* | 7/2021 | Koseki | B33Y 40/00 |

FOREIGN PATENT DOCUMENTS

| | | |
|---|---|---|
| JP | S62-13578 | 1/1987 |
| JP | S64-56861 | 3/1989 |

(Continued)

OTHER PUBLICATIONS

Kim, Jeong-Min, et al. "Microstructure and oxidation behavior of CrAl laser-coated Zircaloy-4 alloy." Metals 7.2 (2017): 59. (Year: 2017).*

(Continued)

*Primary Examiner* — Matthew T Martin
*Assistant Examiner* — Grace Ann Kenlaw
(74) *Attorney, Agent, or Firm* — LEX IP MEISTER, PLLC (57) ABSTRACT

Disclosed are a method for coating metal, a metal member comprising the coating layer formed thereby, and a fuel cell separator. A method for coating metal according to an embodiment of the present invention includes preparing a metal base material; and forming a molten pool by irradiating a laser to a surface of the metal base material and forming a coating layer using an additive manufacturing by supplying a powder made of any one of Si, SiC, and a mixture of Cr and Al to the molten pool.

3 Claims, 8 Drawing Sheets

(51) Int. Cl.
*B33Y 80/00* (2015.01)
*H01M 8/021* (2016.01)
*H01M 8/0228* (2016.01)

(58) Field of Classification Search
CPC ..... B33Y 80/00; H01M 8/021; H01M 8/0228; Y02P 10/25; C22C 1/0416
See application file for complete search history.

(56) References Cited

FOREIGN PATENT DOCUMENTS

| | | |
|---|---|---|
| JP | 2001-527601 | 12/2001 |
| KR | 20140001298 | 1/2014 |
| KR | 20160024197 | 3/2016 |
| WO | 2017-163433 X | 9/2017 |

OTHER PUBLICATIONS

Angelastro, A., S. L. Campanelli, and G. Casalino. "Statistical analysis and optimization of direct metal laser deposition of 227-F Colmonoy nickel alloy." Optics & Laser Technology 94 (2017): 138-145. (Year: 2017).*
Kim, Hyun-Gil, et al. "Adhesion property and high-temperature oxidation behavior of Cr-coated Zircaloy-4 cladding tube prepared by 3D laser coating." Journal of Nuclear Materials 465 (2015): 531-539. (Year: 2015).*
De Las Heras, N., et al. "A review of metal separator plate materials suitable for automotive PEM fuel cells." Energy & Environmental Science 2.2 (2009): 206-214. (Year: 2009).*
Tai, X. Y., et al. "Accelerating fuel cell development with additive manufacturing technologies: state of the art, opportunities and challenges." Fuel Cells 19.6 (2019): 636-650. (Year: 2019).*
JPO, Office Action of JP 2021-190252 dated Dec. 6, 2022.
Jeong-Min Kim et al., "Effects of Si Addition on the Microstructure and Properties of Cr—Al alloy for High Temperature Coating", Korean J. Mater. Res., vol. 29, No. 1 (2019), https://doi.org/10.3740/MRSK.2019.29.1.7.

* cited by examiner

Cr10Al Coated

Si Coated

SiC Coated

METHOD FOR COATING METAL, METAL MEMBER COMPRISING COATING LAYER FORMED THEREBY AND FUEL CELL SEPARATOR

CROSS-REFERENCE TO RELATED APPLICATION

This application claims priority to and the benefit of Korean Patent Application No. 10-2020-0158757, filed on Nov. 24, 2020, the disclosure of which is incorporated herein by reference in its entirety.

TECHNICAL FIELD

The present invention relates to a method for coating metal, a metal member comprising a coating layer formed thereby, and a fuel cell separator, and more particularly, a method for forming a coating layer on a metal base material by an additive manufacturing, a metal member comprising the coating layer formed thereby, and a fuel cell separator.

BACKGROUND

The hydrogen fuel cell separator serves to separate hydrogen, oxygen, and cooling water from each other and uniformly supplies them over the entire area of the fuel cell, while collecting the current generated by the electrochemical reaction.

Conventionally, a graphite material was used for a hydrogen fuel cell separator, but the graphite material has low strength, is difficult to secure gas tightness, as well as has a high manufacturing cost. So, research and development to apply a metal material that can replace it is being actively conducted. The metal-based separator is recognized as a technology that is easy to commercialize due to its high strength and application of mass production technologies such as stamping.

However, metal materials have problems such as damage caused by corrosion in a fuel cell environment and an increase in resistance value due to the formation of an oxide film. Such a problem is acting as an obstacle to the commercialization of metal-based separators. In order to solve this problem, a method of performing an oxidation-resistant coating on the surface of a metal material separator has been proposed.

The oxidation-resistant coating can be largely divided into a wet process and a dry process. As a wet process, electroplating, polymer or mixed coating technology of polymer and conductive particles is being introduced. In addition, as a dry process, various oxidation-resistant and high-conductivity material coating studies using CVD, PVD, and plasma coating technologies are being conducted.

Despite these various coating technologies, it is still difficult to satisfy various performances of metal separators for hydrogen fuel cells and to secure economic feasibility. Accordingly, it is required to develop a new technology that can ensure durability and economy while satisfying electrical conductivity, thermal conductivity, gas tightness and corrosion resistance of the metal separator for hydrogen fuel cell.

The above information disclosed in this Background section is only for enhancement of understanding of the background of the invention and it may therefore contain information that does not form the prior art that is already known to a person of ordinary skill in the art.

(Related Art Document 1) Korean Registered Patent No. 10-1609214 (registered on Mar. 30, 2016)

SUMMARY

Technical Problem

Various aspects of the present invention are directed to providing a method for coating metal that satisfies the performance such as corrosion resistance of a metal separator for a hydrogen fuel cell while ensuring durability and economy, and a metal member including a coating layer formed thereby.

Various aspects of the present invention are directed to providing a fuel cell separator having corrosion resistance, durability and economy.

Technical Solution

In an aspect of the present invention, a method for coating metal may include preparing a metal base material; and forming a molten pool by irradiating a laser to a surface of the metal base material and forming a coating layer using an additive manufacturing by supplying a powder made of any one of Si, SiC, and a mixture of Cr and Al to the molten pool.

In another aspect of the present invention, a metal member may include a metal base material; and a coating layer formed on a surface of the metal base material by the method for coating metal.

In yet another aspect of the present invention, a fuel cell separator may include a base material made of metal; a mixed layer formed by melting and mixing a coating material made of any one of Si, SiC, and a mixture of Cr and Al together with the base material on the surface of the base material; and a flow path formed by laminating the coating material on the surface of the mixed layer.

Advantageous Effects

According to one embodiment of the present invention, it is possible to form a coating layer using an additive manufacturing by supplying a powder made of any one of Si, SiC, and a mixture of Cr and Al to a surface of a metal base material, thereby capable of providing a metal member having corrosion resistance, durability and economy.

In addition, according to another embodiment of the present invention, it is possible to provide a fuel cell separator having corrosion resistance, durability and economy through a structure in which a mixed layer formed by melting a base material and a coating material together is provided on the surface of the base material, and a flow path is laminated with a coating material on the mixed layer.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which.

DETAILED DESCRIPTION OF THE EMBODIMENTS

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity. Throughout the specification, like reference numerals denote like elements.

It is understood that the terms "comprise" or "have" when used in this specification, are intended to describe the presence of stated features, integers, steps, operations, members, components and/or a combination thereof but not preclude the possibility of the presence or addition of one or more other features, integers, steps, operations, members, components, or a combination thereof.

Figure 1:
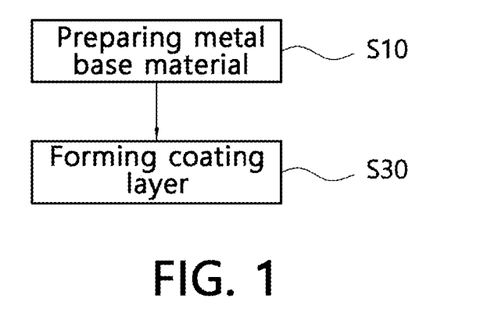
FIG. 1 is a flowchart of a method for coating metal according to an exemplary embodiment of the present invention.
Figure 2:
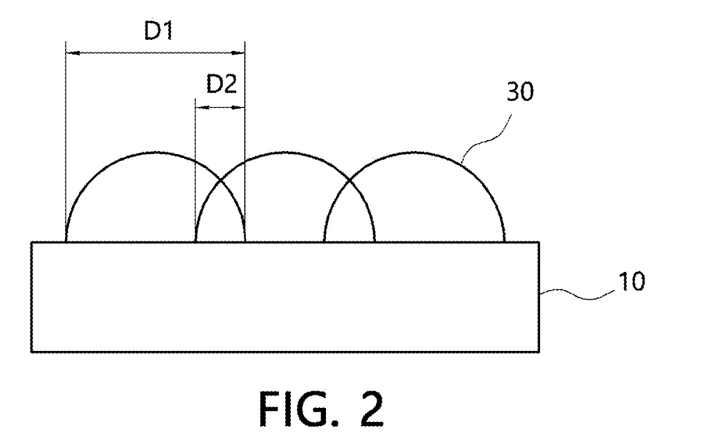
FIG. 2 is a view showing a process in which a coating layer is formed on a metal base material by a method for coating metal according to an exemplary embodiment of the present invention.

FIG. 1 is a flowchart of a method for coating metal according to an exemplary embodiment of the present invention. FIG. 2 is a view showing a process in which a coating layer is formed on a metal base material by a method for coating metal according to an exemplary embodiment of the present invention.

According to the method for coating metal according to an embodiment of the present invention, it is possible to form an oxidation-resistant coating layer on the surface of a metal base material. The method for coating metal according to an embodiment of the present invention may be applied to manufacturing a fuel cell separator. More specifically, the method for coating metal according to an embodiment of the present invention can provide a 3D printing process technology for oxidation-resistant coating and flow path formation of a metal separator for a hydrogen fuel cell.

The method for coating metal according to an embodiment of the present invention improves durability by coating an oxidation-resistant, high-conductive material to maintain a strong bonding force with a metal base material. In addition, when performing additive manufacturing (3D printing) according to the method for coating metal according to an embodiment of the present invention, the efficiency per unit area of the metal separator may be increased by controlling the surface roughness and the flow path, and the flow path may be formed.

Referring to FIGS. 1 and 2, the method for coating metal according to an embodiment of the present invention may include preparing a metal base material at step S10 and forming a coating layer at step S30.

In the step S10 of preparing the metal base material 10, the metal base material 10 on which the coating layer 30 is to be formed on the surface is prepared. In an embodiment of the present invention, the metal base material 10 may be a fuel cell separator. In this case, the fuel cell may be a hydrogen fuel cell.

For example, the material of the metal base material 10 may be stainless steel (SUS). More specifically, the material of the metal base material 10 may be SUS304, SUS316, or the like.

According to an embodiment of the present invention, since the coating layer 30 having corrosion resistance may be stably formed on the surface of the metal base material 10, even if the SUS304 material, which is relatively inexpensive compared to SUS316, is used, various performances including corrosion resistance of the metal separator for hydrogen fuel cell may be sufficiently secured.

In the step S30 of forming the coating layer 30, a laser is irradiated to a surface of the metal base material 10 to form a molten pool, and a powder made of any one of Si, SiC, and a mixture of Cr and Al is supplied to the molten pool to form the coating layer 30 by an additive manufacturing method.

In this case, the additive manufacturing method may be a direct energy deposition (DED) method. More specifically, the additive manufacturing process may be performed using a powder supply nozzle for 3D laser printing disclosed in Korean Patent Registration No. 1609214.

A mixture of Cr and Al may be a solid solution. In addition, the mixture of Cr and Al may be composed of 85 to 95 wt % of Cr and 5 to 15 wt % of Al. The mixture of Cr and Al forms the coating layer 30 on the surface of the metal base material 10, and is in contact with oxygen to form $Cr_2O_3$ and $Al_2O_3$ on the surface of the coating layer 30, respectively. $Cr_2O_3$ and $Al_2O_3$ form nanometer-scale thin films and provide corrosion resistance. In a mixture of Cr and Al, when the composition ratio of Al is less than 5 wt %, $Al_2O_3$ is not sufficiently generated, and when the composition ratio of Al is greater than 15 wt %, the amount of intermetallic compound weak to impact may increase and corrosion resistance performance may be reduced.

Si may form the coating layer 30 on the surface of the metal base material 10, and be in contact with oxygen to form a nanometer-scale $SiO_2$ thin film on the surface of the coating layer 30. The $SiO_2$ thin film provides corrosion resistance. In addition, SiC itself provides excellent corrosion resistance.

As such, a mixture of Cr and Al, Si and SiC, has excellent acid resistance in a fuel cell environment and excellent electrical conductivity without forming an oxide film. In the step S30 of forming the coating layer 30, heterogeneous particles having such properties are laminated (coated) on the surface of the metal base material 10.

In order to maintain the oxidation resistance and airtightness of the coating layer 30, while adjusting the energy range of the laser used as a heat source to make the coating material powder in a molten state of 50% or more, it is preferable to improve the bonding strength of the interface by melting the surface of the metal base material in the range of 20 to 60% to form a mixed layer in which the coating material powder and the metal base material 10 are partially mixed.

In this case, it is preferable that the rear surface (bottom) of the metal base material 10 contacts and circulates the refrigerant so that the temperature may be maintained at 100° C. or less. This is because, when the temperature of the metal base material 10 is excessively increased, a problem in which the thickness of the reaction layer becomes thick may occur.

Meanwhile, in the step S30 of forming the coating layer 30, the coating layer 30 may be formed with a pattern. For example, when the metal base material 10 is a fuel cell separator, the coating layer 30 may be formed as a flow path having a pattern. In addition, when the coating layer 30 is formed, the powder particles protrude to maximize the surface area in the fuel cell environment, thereby increasing the efficiency per unit area. As described above, the performance of the fuel cell separator may be improved by the coating layer 30 formed according to an embodiment of the present invention.

In the step S30 of forming the coating layer 30, the additive manufacturing may be performed under the conditions of a laser power of 180 to 220 W and a hatching distance of 0.21 to 0.39 mm. In this case, the focus of the laser irradiation may be set to 0.

Referring to FIG. 2, the hatching distance D2 corresponds to the overlapping distance between adjacent molten pools. In an embodiment of the present invention, the diameter D1 of the molten pool generated by irradiating the laser is 1 mm, the hatching distance D2 may be set to 0.21 to 0.39 mm.

If the hatching distance D2 is excessively out of the above range, the efficiency of forming the coating layer 30 is lowered, and when the hatching distance D2 is too small, there is a possibility that a portion in which the coating layer 30 is not formed properly is likely to occur.

In the step S30 of forming the coating layer 30, when the powder is a mixture of 90 wt % Cr and 10 wt % Al, the additive manufacturing may be performed under the condition of a scan speed of 6 to 12 mm/s.

In this case, the powder may be discharged to the molten pool together with the powder gas supplied at 6-7 L/min. The powder gas may be composed of an inert gas. For example, the powder gas may be argon (Ar) gas.

In addition, when the laser is irradiated, an inner gas supplied at 6.5 to 7.5 L/min may be discharged together. The inner gas may be composed of an inert gas. The inner gas allows the powder to be dispersed smoothly in the molten pool. For example, the inner gas may be argon (Ar) gas.

When a powder of a mixture consisting of 90 wt % Cr and 10 wt % Al is laminated by an additive manufacturing on a metal base material made of SUS304 to form a coating layer, table 1 below shows process conditions for producing 5 specimens at different scan speeds while fixing that the laser power is 200 W, the focus is 0, the inner gas supply rate is 7 L/min, the powder gas supply rate is 6.5 L/min and the hatching distance is 0.3 mm

TABLE 1

| Specimen | Laser power | Scan speed | Focus | Gas (Inner gas/ Powder gas) | Hatching distance |
| --- | --- | --- | --- | --- | --- |
| 1 | 200 W | 6 mm/s | 0 | 7/6.5 (L/min) | 0.3 mm |
| 2 | 200 W | 8 mm/s | 0 | 7/6.5 (L/min) | 0.3 mm |
| 3 | 200 W | 10 mm/s | 0 | 7/6.5 (L/min) | 0.3 mm |
| 4 | 200 W | 12 mm/s | 0 | 7/6.5 (L/min) | 0.3 mm |
| 5 | 200 W | 14 mm/s | 0 | 7/6.5 (L/min) | 0.3 mm |

Figure 3:
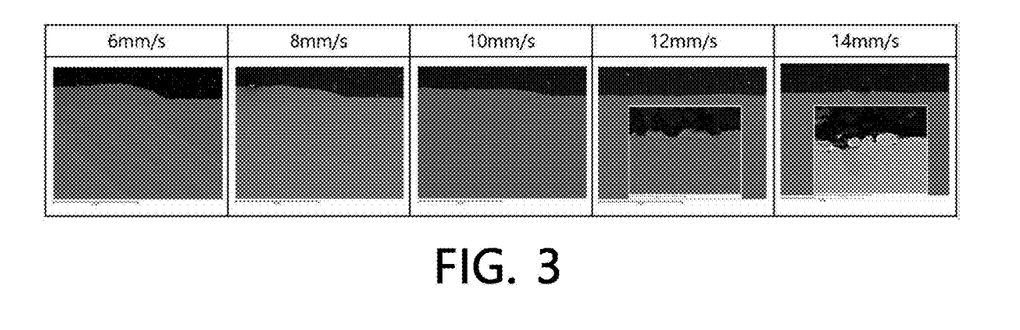
FIG. 3 shows electron micrographs of specimens prepared by laminating Cr10Al powder on the surface of SUS304 at different scan speeds.

FIG. 3 shows electron micrographs of cross-sections of the metal base material and the coating layer after the step S30 of forming the coating layer according to the lamination process conditions according to Table 1 is performed.

Referring to FIG. 3, when a powder of a mixture consisting of 90 wt % Cr and 10 wt % Al is laminated by an additive manufacturing on a metal base material made of SUS304 to form a coating layer, when the scan speed exceeds 12 mm/s, it is confirmed that the coating thickness is reduced and the coating is made intermittently. Therefore, when a powder of a mixture consisting of 90 wt % Cr and 10 wt % Al is laminated on a metal base material, the appropriate scan speed is found to be 6 to 12 mm/s, and considering the efficiency, it is judged that the 12 mm/s scan speed is preferable.

In the step S30 of forming the coating layer 30, when the powder is made of Si or SiC, the additive manufacturing may be performed under the condition of a scan speed of 4 to 8 mm/s.

In this case, the powder may be discharged to the molten pool together with a powder gas supplied at 6-7 L/min. The powder gas may be composed of an inert gas. For example, the powder gas may be argon (Ar) gas.

In addition, when the laser is irradiated, the inner gas supplied at 6.5 to 7.5 L/min may be discharged together. The inner gas may be composed of an inert gas. The inner gas allows the powder to be dispersed smoothly in the molten pool. For example, the inner gas may be argon (Ar) gas.

When a powder made of SiC is laminated by an additive manufacturing on a metal base material made of SUS304 to form a coating layer, table 2 below shows process conditions for producing 5 specimens at different scan speeds while fixing that the laser power is 220 W, the focus is 0, the inner gas supply rate is 7 L/min, the powder gas supply rate is 6.5 L/min and the hatching distance is 0.3 mm

TABLE 2

| Specimen | Laser power | Scan speed | Focus | Gas (Inner gas/ Powder gas) | Hatching distance |
| --- | --- | --- | --- | --- | --- |
| 1 | 220 W | 4 mm/s | 0 | 7/6.5 (L/min) | 0.3 mm |
| 2 | 220 W | 6 mm/s | 0 | 7/6.5 (L/min) | 0.3 mm |
| 3 | 220 W | 8 mm/s | 0 | 7/6.5 (L/min) | 0.3 mm |
| 4 | 220 W | 10 mm/s | 0 | 7/6.5 (L/min) | 0.3 mm |

Figure 4:
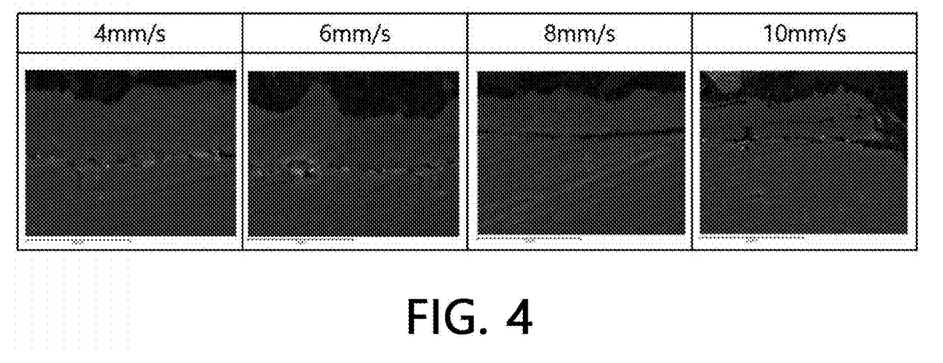
FIG. 4 shows electron micrographs of specimens prepared by laminating SiC powder on the surface of SUS304 at different scan speeds.

FIG. 4 shows electron micrographs of cross-sections of the metal base material and the coating layer after the step S30 of forming the coating layer according to the lamination process conditions according to Table 2 is performed.

Referring to FIG. 4, when a powder made of SiC is laminated by an additive manufacturing on a metal base material made of SUS304 to form a coating layer, when the scan speed exceeds 8 mm/s, it was confirmed that the coating thickness is reduced and the coating is made intermittently. Therefore, when a powder made of SiC is laminated on a metal base material, the appropriate scan speed is found to be 4 to 8 mm/s, and considering the efficiency, it is judged that the 8 mm/s scan speed is preferable.

It was confirmed that the results according to the process conditions when the powder made of SiC is laminated by an additive manufacturing on the metal base material made of SUS304 to form the coating layer appeared similarly when the powder made of Si is laminated on the metal base material made of SUS304 to form the coating layer.

Meanwhile, in the step S30 of forming the coating layer, all the above-described processes may be performed in a state of cooling a back surface of the metal base material to maintain the temperature of the back surface of the metal base material at 100° C. or less.

Figure 5:
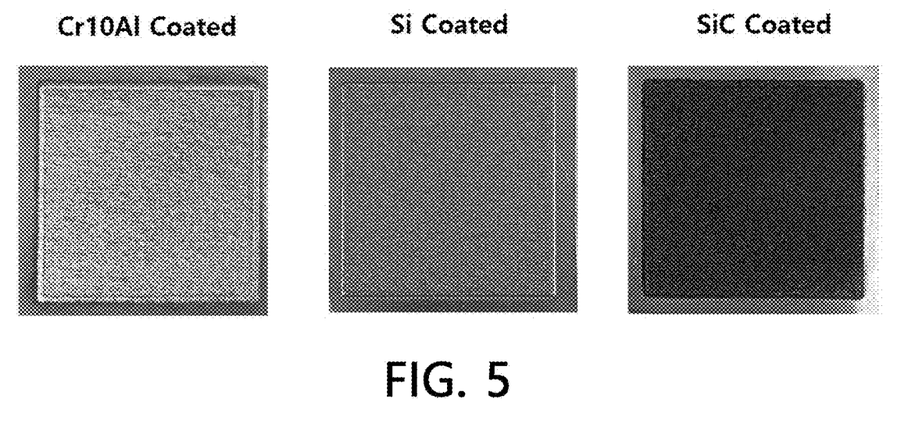
FIG. 5 shows photographs of specimens prepared according to a method for coating metal according to an exemplary embodiment of the present invention.
Figure 6:
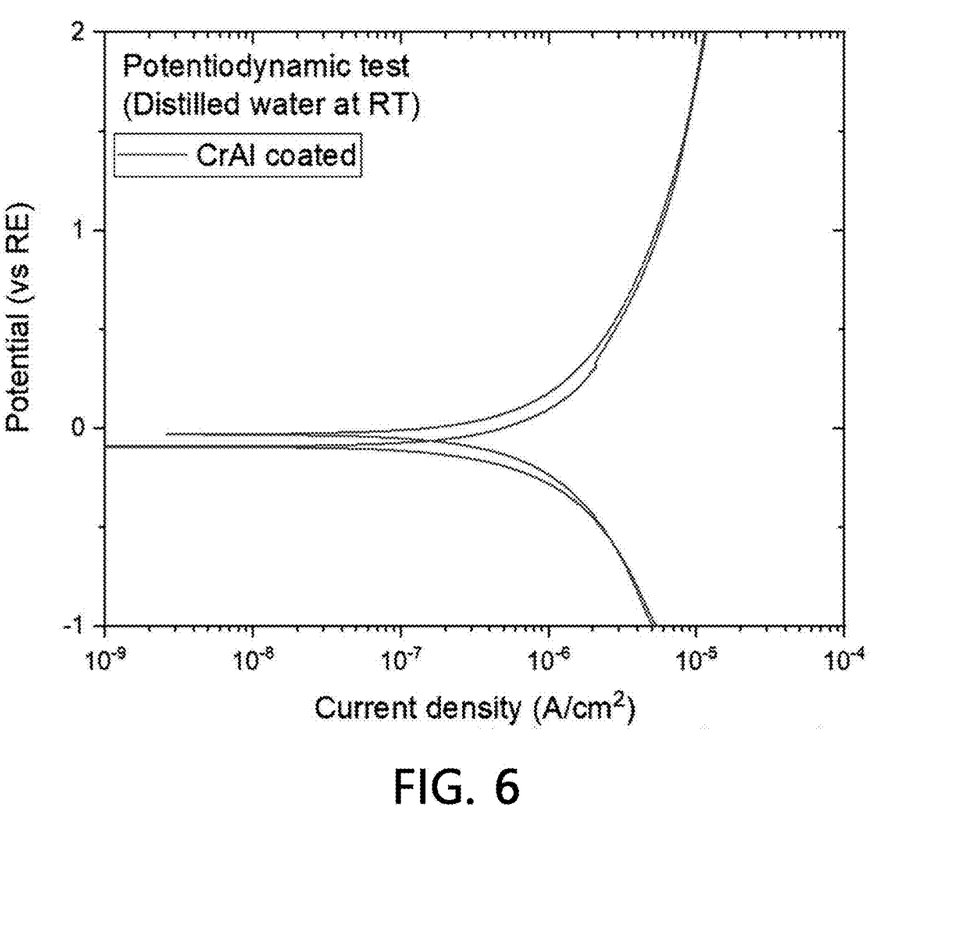
FIG. 6 is a graph showing the evaluation results of corrosion characteristics (polarization test) of a specimen in which Cr10Al powder is laminated on the surface of SUS304 according to an exemplary embodiment of the present invention.
Figure 7:
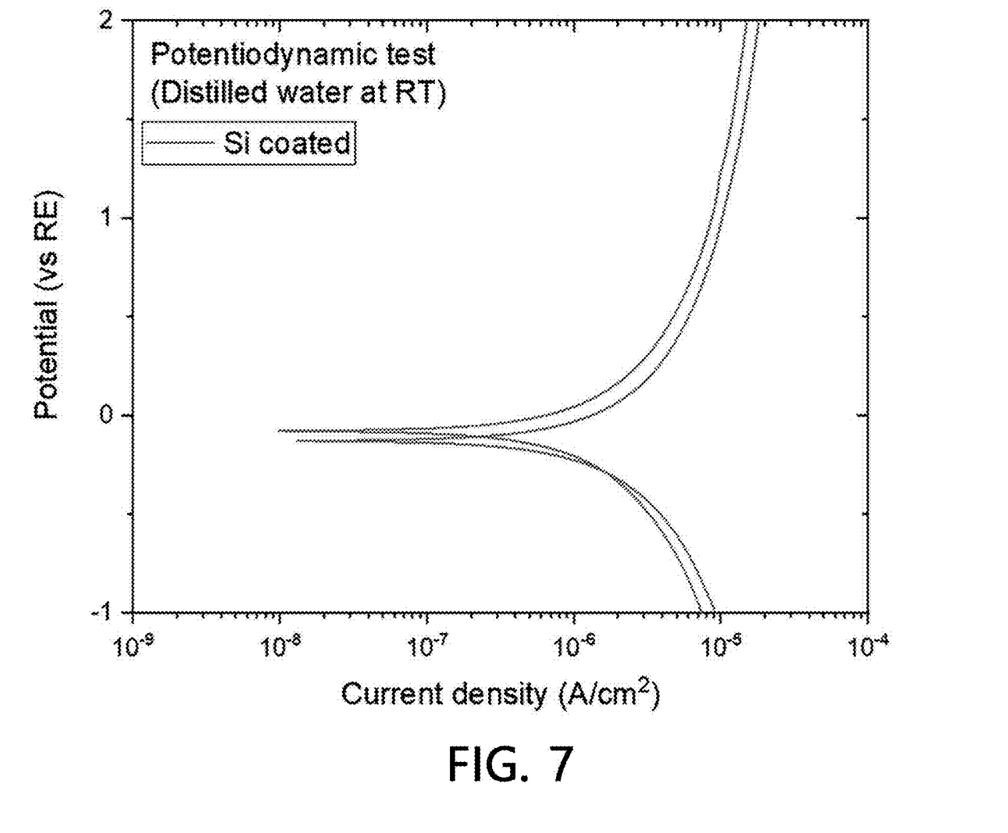
FIG. 7 is a graph showing the evaluation results of corrosion characteristics (polarization test) of a specimen in which Si powder is laminated on the surface of SUS304 according to an exemplary embodiment of the present invention.
Figure 8:
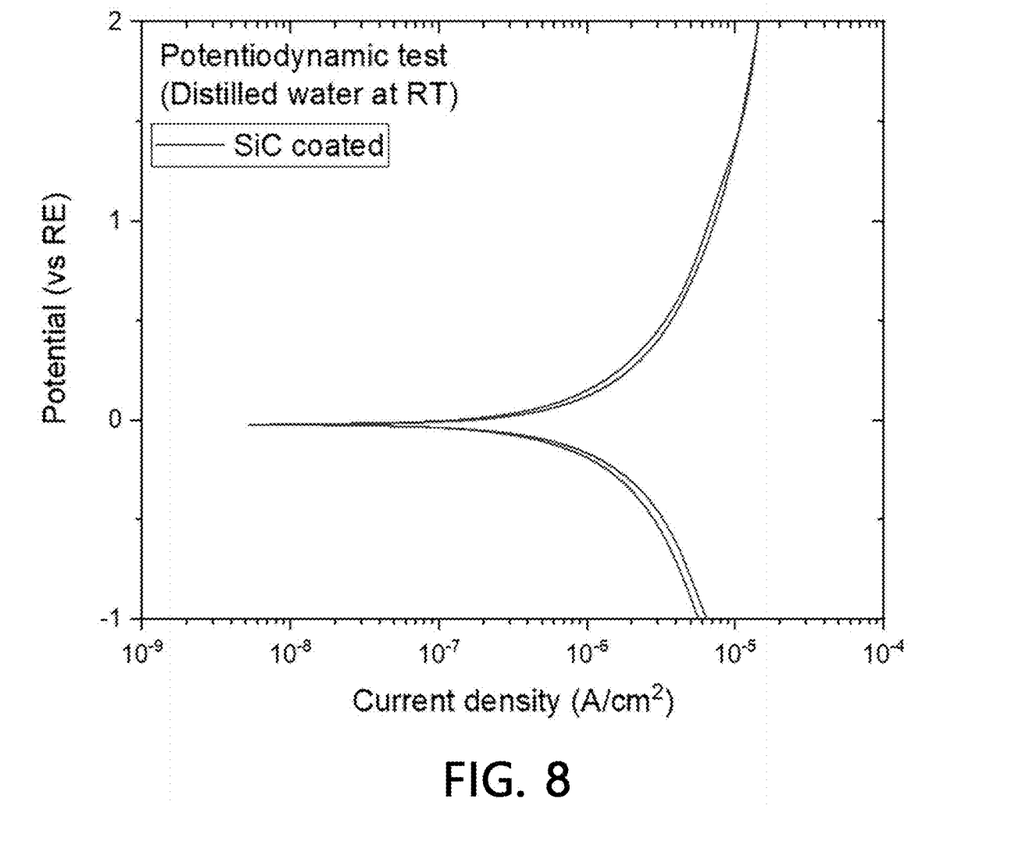
FIG. 8 is a graph showing the evaluation results of corrosion characteristics (polarization test) of a specimen in which SiC powder is laminated on the surface of SUS304 according to an exemplary embodiment of the present invention.
Figure 9:
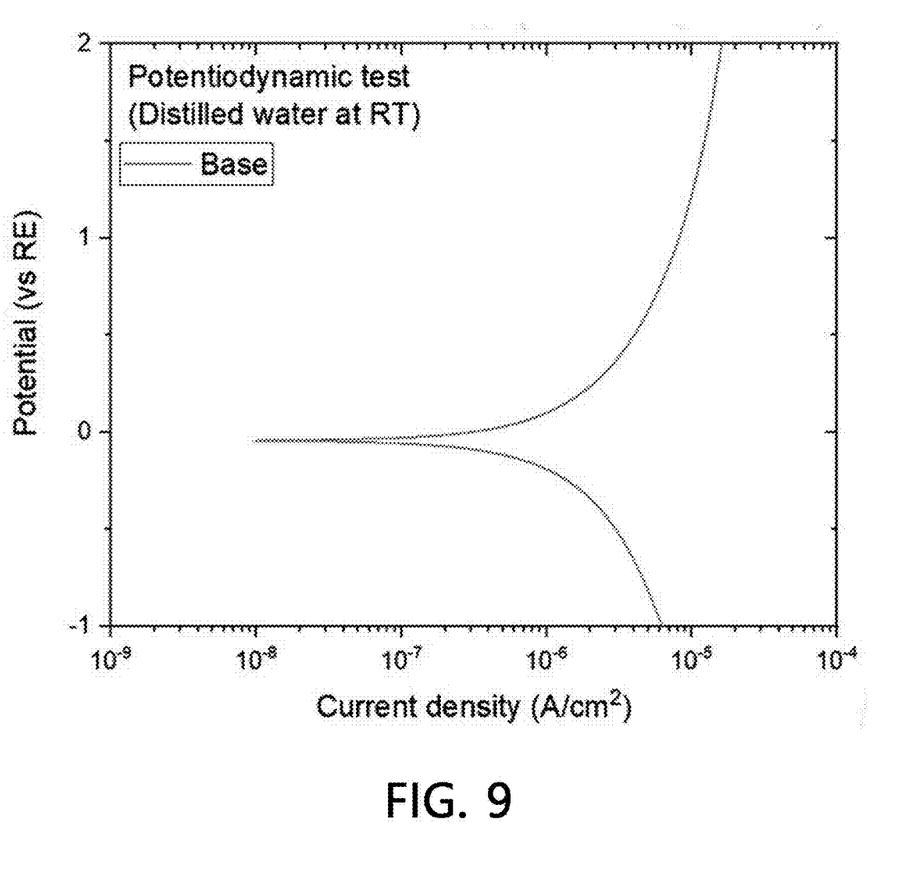
FIG. 9 is a graph showing the evaluation results of corrosion characteristics (polarization test) of SUS304 in which a coating layer is not formed.

FIG. 5 shows photographs of specimens prepared according to a method for coating metal according to an exemplary embodiment of the present invention. In FIG. 5, Cr10Al means a mixture composed of 90 wt % Cr and 10 wt % Al. In addition, FIG. 6 is a graph showing the evaluation results of corrosion characteristics (polarization test) of a specimen in which Cr10Al powder is laminated on the surface of SUS304 according to an exemplary embodiment of the present invention, FIG. 7 is a graph showing the evaluation results of corrosion characteristics (polarization test) of a specimen in which Si powder is laminated on the surface of SUS304 according to an exemplary embodiment of the present invention, and FIG. 8 is a graph showing the evaluation results of corrosion characteristics (polarization test) of a specimen in which SiC powder is laminated on the surface of SUS304 according to an exemplary embodiment of the present invention. Meanwhile, FIG. 9 shows a graph showing the evaluation results of corrosion characteristics (polarization test) of SUS304 in which a coating layer is not formed.

Based on this, the corrosion current and corrosion rate of each specimen and comparative example are determined as shown in Table 3 below.

TABLE 3

|  | Corrosion current ($i_{corr}$, µA)/cm$^2$) | Corrosion rate (mm/yr) |
| --- | --- | --- |
| CrAl coated specimen | 1.285 | $9.79 \times 10^{-3}$ |
| Si coated specimen | 1.683 | $1.66 \times 10^{-2}$ |
| SiC coated specimen | 1.555 | $1.58 \times 10^{-2}$ |
| Metal base material (Comparative example) | 2.110 | $2.20 \times 10^{-2}$ |

Figure 10:
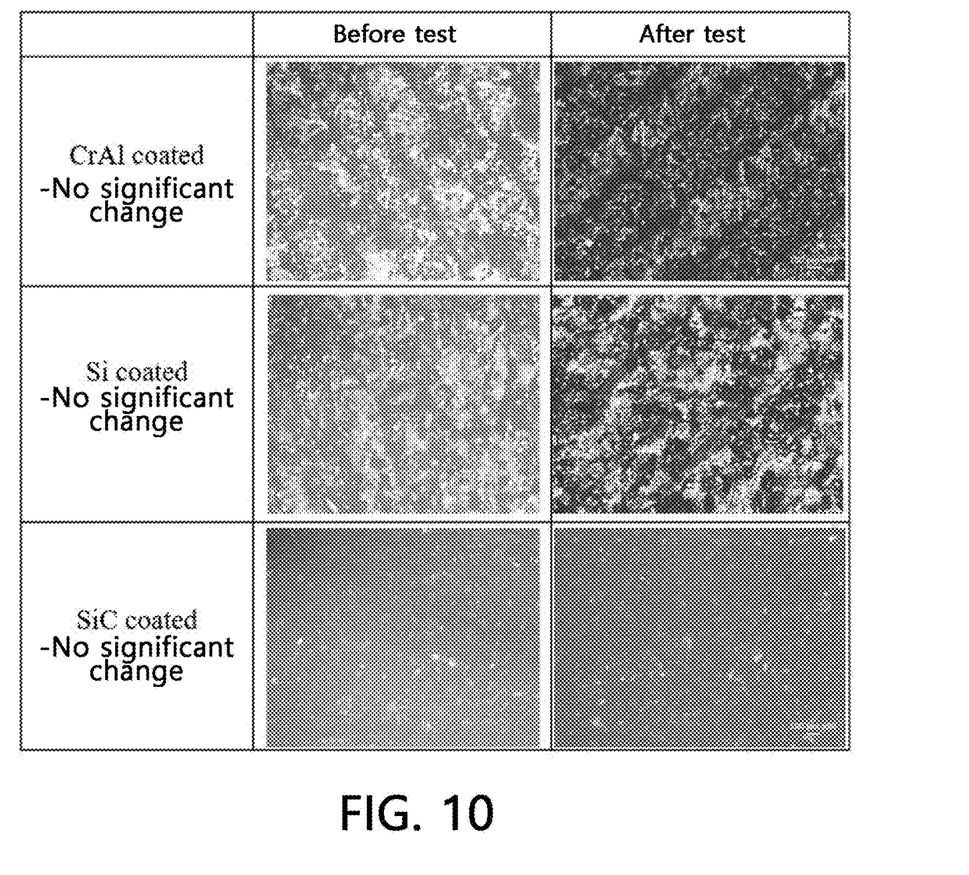
FIG. 10 shows photographs of the surface of the specimens before and after the polarization test.

Referring to Table 3, it can be seen that the corrosion characteristics of the specimens prepared according to the embodiment of the present invention are all superior to those of the comparative example. Meanwhile, the surface photos of the specimens before and after the polarization test are shown in FIG. 10, and referring to FIG. 10, it can be seen that corrosion hardly appears on the surface of the specimen after the actual test.

As described above, according to the method for coating metal according to the present invention, a metal member including a metal base material 10 and a coating layer 30 formed on the surface of the metal base material 10 by the method for coating metal is provided. For example, the metal member may be a metal separator of a hydrogen fuel cell.

As described above, according to the present invention, it is possible to control the flow path shape and surface structure required for a fuel cell separator while improving corrosion characteristics by coating the surface with an oxidation resistant material regardless of the material and shape of the metal base material.

Figure 11:
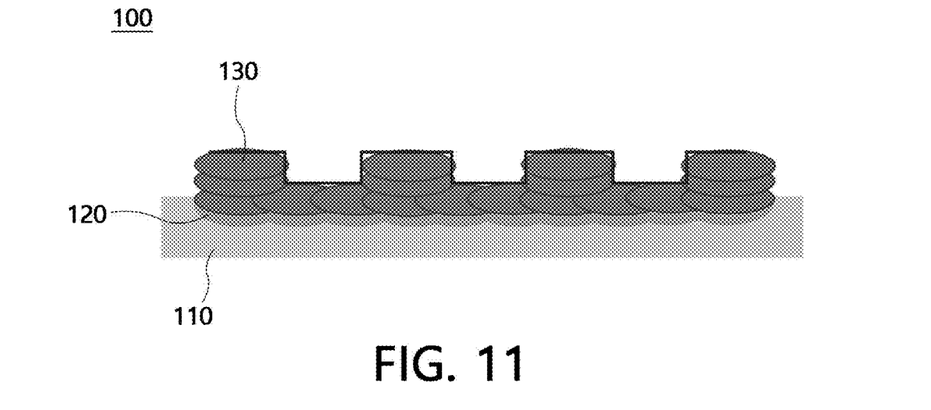
FIG. 11 is a view showing a cross-sectional structure of a fuel cell separator according to an exemplary embodiment of the present invention.
Figure 12:
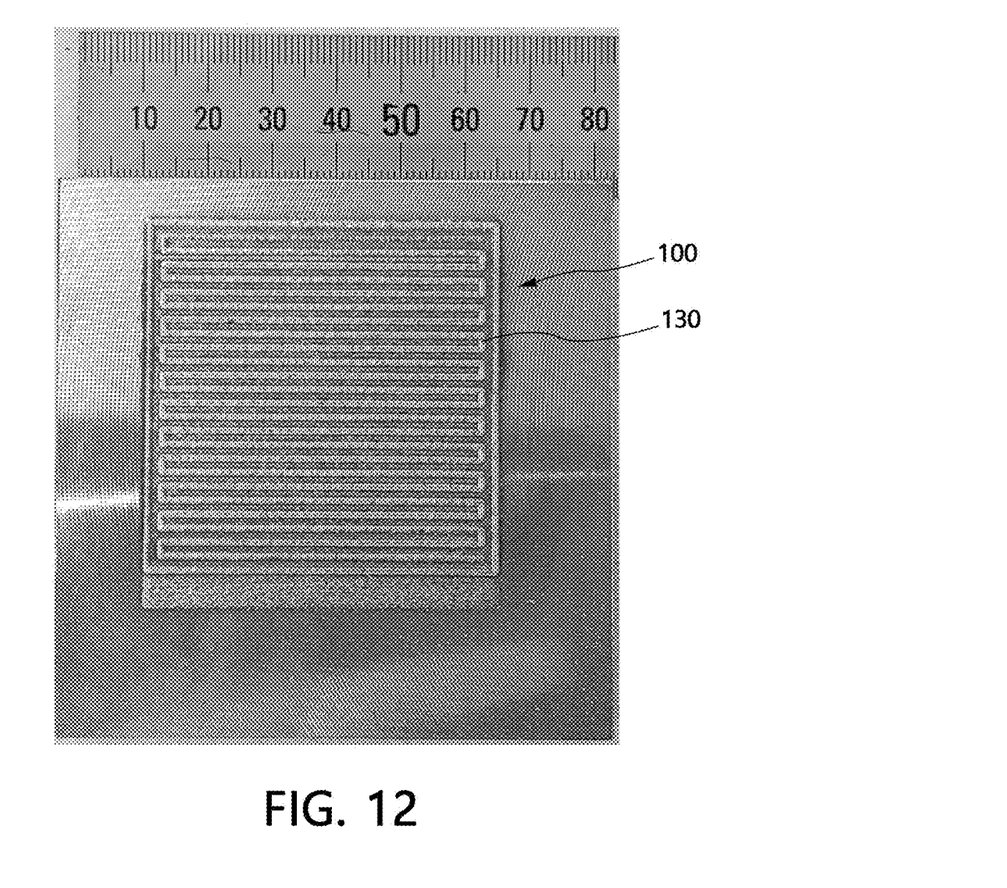
FIG. 12 is a photograph of a fuel cell separator according to an exemplary embodiment of the present invention.

FIG. 11 is a view showing a cross-sectional structure of a fuel cell separator according to an exemplary embodiment of the present invention, and FIG. 12 is a photograph of a fuel cell separator according to an exemplary embodiment of the present invention.

Referring to FIG. 11 and FIG. 12, the fuel cell separator 100 according to an embodiment of the present invention includes a base material 110, a mixed layer 120, and a flow path 130.

The base material 110 is a part constituting the body of the fuel cell separator. The base material 110 may be made of metal. More specifically, the metal may be made of stainless steel (e.g., SUS316 or SUS304).

The mixed layer 120 is formed by melting and mixing a coating material made of any one of a mixture of Cr and Al, Si and SiC together with the base material 110 on the surface of the base material 110. The mixed layer 120 may be formed by melting and mixing the coating material supplied in a powder state in a state in which the base material 110 is melted. The mixed layer 120 improves the bonding strength of the interface between the base material 110 and the flow path 130.

In an embodiment of the present invention, the mixed layer 120 may be formed by the method for coating metal according to an embodiment of the present invention as described above. In other words, the surface of the base material 110 may be irradiated with a laser to melt the base material 110 to a predetermined depth to form a molten pool, and the powder of the coating material may be supplied to the molten pool to form the mixed layer 120. More specifically, the mixed layer 120 may be formed in a state in which 50% or more of the powder is melted through laser irradiation and the surface of the base material 110 is melted in a range of 20 to 60%.

The interface between the mixed layer 120 and the base material 110 may have a wavy shape. When the interface between the mixed layer 120 and the base material 110 has a wavy shape, the area of the interface is increased compared to the case where the interface between the mixed layer 120 and the base material 110 is formed side by side. Accordingly, interfacial bonding strength and peeling resistance between the mixed layer 120 and the base material 110 may be increased. When the mixed layer 120 is formed by the method for coating metal according to an embodiment of the present invention, the shape of the interface between the mixed layer 120 and the base material 110 may be controlled by adjusting the diameter of the molten pool formed by the laser irradiated to the surface of the base material 110, the overlapping distance between adjacent molten pools, and the like.

The flow path 130 is formed by laminating the coating material on the surface of the mixed layer 120. The flow path 130 may be formed together with the mixed layer 120 through an additive manufacturing method. For example, the additive manufacturing method may be a direct energy deposition (DED) method.

As described above, the coating material may be a mixture of Cr and Al. In this case, the mixture of Cr and Al may be a solid solution composed of 85 to 95 wt % of Cr and 5 to 15 wt % of Al. The mixture of Cr and Al is in a state of being laminated on the surface of the mixed layer 120 and is in contact with oxygen to form $Cr_2O_3$ and $Al_2O_3$ on the surface, respectively. $Cr_2O_3$ and $Al_2O_3$ form nanometer-scale thin films and provide corrosion resistance. In a mixture of Cr and Al, when the composition ratio of Al is less than 5 wt %, $Al_2O_3$ is not sufficiently generated, and when the composition ratio of Al is greater than 15 wt %, the amount of intermetallic compound weak to impact may increase and corrosion resistance performance may be reduced.

In addition, the coating material may be composed of Si or SiC. Si may form the flow path 130 in a state in which it is laminated on the surface of the mixed layer 120, and the surface thereof may be in contact with oxygen to form a nanometer-scale $SiO_2$ thin film. The $SiO_2$ thin film provides corrosion resistance. In addition, SiC itself provides excellent corrosion resistance.

Although exemplary embodiments of the present invention have been described, the spirit of the present invention is not limited to the embodiments set forth herein. Those of ordinary skill in the art who understand the spirit of the present invention may easily propose other embodiments through supplement, change, removal, addition, etc. of elements within the same spirit, but the embodiments will be also within the scope of the present invention.

What is claimed is:

1. A method for coating a fuel cell separator, comprising:
   preparing a sheet of metal base material made of stainless steel (SUS);
   forming a molten pool by irradiating a laser to a surface of the metal base material; and
   forming a coating layer using additive manufacturing by supplying a powder made of a mixture of Cr and Al to the molten pool,
   wherein the forming of the coating layer is performed in a state of cooling a back surface of the sheet of metal base material made of stainless steel (SUS) to maintain a temperature of the back surface of the sheet of metal base material made of stainless steel (SUS) at 100° C. or less,
   wherein the additive manufacturing is performed under the conditions of a laser power of 180 to 220 W and a hatching distance of 0.21 to 0.39 mm, wherein the powder is made of a solid solution composed of 85 to 95 wt % of Cr and 5 to 15 wt % of Al and wherein the additive manufacturing is performed at a scan speed of 6 to 12 mm/s.

2. The method of claim 1, wherein the powder is discharged to the molten pool together with a powder gas supplied at 6-7 L/min.

3. The method of claim 2, wherein when the laser is irradiated, an inner gas supplied at 6.5 to 7.5 L/min is discharged together with the laser.

* * * * *